(12) United States Patent
Nakayama et al.

(10) Patent No.: US 7,125,622 B2
(45) Date of Patent: Oct. 24, 2006

(54) METHOD OF PRODUCING OXIDE ION CONDUCTOR

(75) Inventors: Susumu Nakayama, Niihama (JP); Yoshikatsu Higuchi, Niiza (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 425 days.

(21) Appl. No.: 10/394,916

(22) Filed: Mar. 21, 2003

(65) Prior Publication Data

US 2003/0180595 A1  Sep. 25, 2003

(30) Foreign Application Priority Data

Mar. 22, 2002  (JP)  ............... 2002-081362

(51) Int. Cl.
*H01M 8/12*  (2006.01)
*H01B 1/08*  (2006.01)

(52) U.S. Cl. ............ 429/33; 429/30; 429/304; 252/500; 252/518.1; 252/519.1; 423/593.1; 264/618; 427/115

(58) Field of Classification Search ............ 252/518.1, 252/519.1, 301.4; 429/30, 33, 304; 423/593.1; 264/618; 427/115
See application file for complete search history.

(56) References Cited

FOREIGN PATENT DOCUMENTS

| JP | 8-208333 | 8/1996 |
|---|---|---|
| JP | 11-71169 | 3/1999 |

OTHER PUBLICATIONS

Abram et al, "A novel enhancement of ionic conductivity in the catio-deficient apatite La9.33(SiO4)6O2," J. Mater. Chem., 2001, 11, 1978-79.*
Arikawa et al, "Oxide ion conductivity in Sr-doped La10Ge6O27 apatite oxide," Solid. St. Ionics, 2000, (136-137), pp. 31-37.*
Reina et al, "High oxide ion conductivity in Al-doped Germanium Oxyapatite," Chem. Mater, 2005, 17, 596-600.*
Fedorov et al, "Some properties of Single crystals of Oxygermanate-apatites," Kristillografiya, 1982, 27(2), 384.*
"Oxide Ion Conductivity in Sr-Doped $La_{10}Ge_6O_g$Apatite Oxide," Solid State Ionics 136-137 (2000 edition); pp. 31-37.
"Ionic Conductivities of Apatite-Type $La_x(GeO_4)_6O_{1.5x-12}$, (X=8-9.33) Polycrystals," Journal of Materials Science Letters 20 (2001 edition), pp. 1627-1629.

* cited by examiner

Primary Examiner—Mark Kopec
Assistant Examiner—Kallambella Vijayakumar
(74) Attorney, Agent, or Firm—Lahive & Cockfield, LLP; Anthony A. Laurentano, Esq.

(57) ABSTRACT

A lanthanum oxide ($La_2O_3$) powder, a germanium oxide ($GeO_2$) powder, and a strontium carbonate ($SrCO_3$) powder are mixed in a ratio so that a composition of the obtained composite oxide $La_lX_m(AO_4)_{6-n}(ZO_4)_nO_p$ satisfies $8 \leq l+m < 10$, $0 \leq m \leq 2$, $0 \leq n \leq 2$ and $0 \leq p \leq 2$. Thenafter, the materials are formed and sintered to prepare an oxide ion conductor. The crystalline structure of $La_lX_m(AO_4)_{6-n}(ZO_4)_nO_p$ belongs to the apatite type structure. The conduction of oxide ion occurs when $O^{2-}$ 14 occupying the 2a site of the apatite type structure moves along the c-axis direction.

6 Claims, 15 Drawing Sheets

FIG. 2

S1: MIX La2O3 POWDER, GeO2 POWDER, AND SrCO3 POWDER TO OBTAIN MIXED POWDER

S2: FORM MIXED POWDER TO OBTAIN FORMED PRODUCT

S3: SINTER FORMED PRODUCT TO OBTAIN OXIDE ION CONDUCTOR
($La_l Sr_m (GeO_4)_6 O_p$ ; $8 \leq l+m < 10, 0 < m \leq 2, 0 \leq P \leq 2$)

- S10: MIX La2O3 POWDER, GeO2 POWDER, AND Al2O3 POWDER TO OBTAIN MIXED POWDER
- S20: HEAT MIXED POWDER TO OBTAIN GRANULAR MATERIAL
- S30: PULVERIZE GRANULAR MATERIAL TO OBTAIN POWDER
- S40: FORM POWDER TO OBTAIN FORMED PRODUCT
- S50: SINTER FORMED PRODUCT TO OBTAIN OXIDE ION CONDUCTOR ($La_s(GeO_4)_{6-n}(AlO_4)_nO_p$ ; $8 \leqq s < 10, 0 < n \leqq 2, 0 \leqq P \leqq 2$)

FIG. 4

| | No. | MIXING AMOUNT OF RAW MATERIAL (g) | | | COMPOSITION OF OXIDE ION CONDUCTOR | | |
|---|---|---|---|---|---|---|---|
| | | La$_2$O$_3$ | GeO$_2$ | SrCO$_3$ | l | m | p |
| EXAMPLE | 1 | 34.75 | 14.9 | 0.35 | 8.93 | 0.1 | 1.5 |
| | 2 | 34.43 | 14.86 | 0.70 | 8.87 | 0.2 | 1.5 |
| | 3 | 33.47 | 14.78 | 1.75 | 8.67 | 0.5 | 1.5 |
| | 4 | 32.82 | 14.73 | 2.45 | 8.53 | 0.7 | 1.5 |
| | 5 | 31.88 | 14.65 | 3.47 | 8.33 | 1.0 | 1.5 |
| | 6 | 34.71 | 14.93 | 0.35 | 8.9 | 0.1 | 1.45 |
| | 7 | 34.35 | 14.94 | 0.71 | 8.8 | 0.2 | 1.40 |
| | 8 | 33.25 | 14.97 | 1.78 | 8.5 | 0.5 | 1.25 |
| | 9 | 32.51 | 15.00 | 2.49 | 8.3 | 0.7 | 1.15 |
| | 10 | 31.41 | 15.03 | 3.56 | 8.0 | 1.0 | 1.0 |
| COMPARATIVE EXAMPLE | 1 | 36.16 | 7.99 | — | (La$_{10}$Ge$_6$O$_{27}$) | | |
| | 2 | (COMPOSITE OXIDE OF La AND Si) | | | (La$_{10}$Si$_6$O$_{27}$) | | |

FIG. 7

| | No. | MIXING AMOUNT OF RAW MATERIAL (g) | | | COMPOSITION OF OXIDE ION CONDUCTOR | | |
|---|---|---|---|---|---|---|---|
| | | $La_2O_3$ | $GeO_2$ | $ZrO_2$ | l | m | p |
| EXAMPLE | 11 | 33.23 | 15.27 | 1.50 | 8.33 | 0.5 | 1.5 |
| | 12 | 31.30 | 15.62 | 3.08 | 7.67 | 1.0 | 1.5 |
| | 13 | 33.45 | 15.07 | 1.48 | 8.5 | 0.5 | 1.75 |
| | 14 | 31.79 | 15.21 | 3.00 | 8.0 | 1.0 | 2.0 |

FIG. 10

| | No. | MIXING AMOUNT OF RAW MATERIAL (g) | | | COMPOSITION OF OXIDE ION CONDUCTOR | | | |
|---|---|---|---|---|---|---|---|---|
| | | La$_2$O$_3$ | GeO$_2$ | Al$_2$O$_3$ | s | 6-n | n | p |
| EXAMPLE | 15 | 36.35 | 12.43 | 1.22 | 9.33 | 5.0 | 1.0 | 1.5 |
| | 16 | 36.99 | 11.18 | 1.83 | 9.5 | 4.5 | 1.5 | 1.5 |
| | 17 | 35.99 | 12.76 | 1.25 | 9.0 | 5.0 | 1.0 | 1.0 |
| | 18 | 36.47 | 11.63 | 1.90 | 9.0 | 4.5 | 1.5 | 0.75 |

FIG. 13

| No. | MIXING AMOUNT OF RAW MATERIAL (g) | | | COMPOSITION OF OXIDE ION CONDUCTOR | | | |
|---|---|---|---|---|---|---|---|
| | La$_2$O$_3$ | GeO$_2$ | NH$_4$H$_2$PO$_4$ | s | 6-n | n | p |
| EXAMPLE 19 | 34.94 | 14.78 | 0.28 | 8.9 | 5.9 | 0.1 | 1.5 |
| 20 | 34.54 | 14.61 | 0.85 | 8.6 | 5.7 | 0.3 | 1.5 |
| 21 | 35.07 | 14.79 | 0.14 | 9.0 | 5.95 | 0.05 | 1.6 |
| 22 | 35.06 | 14.66 | 0.27 | 9.0 | 5.9 | 0.1 | 1.7 |

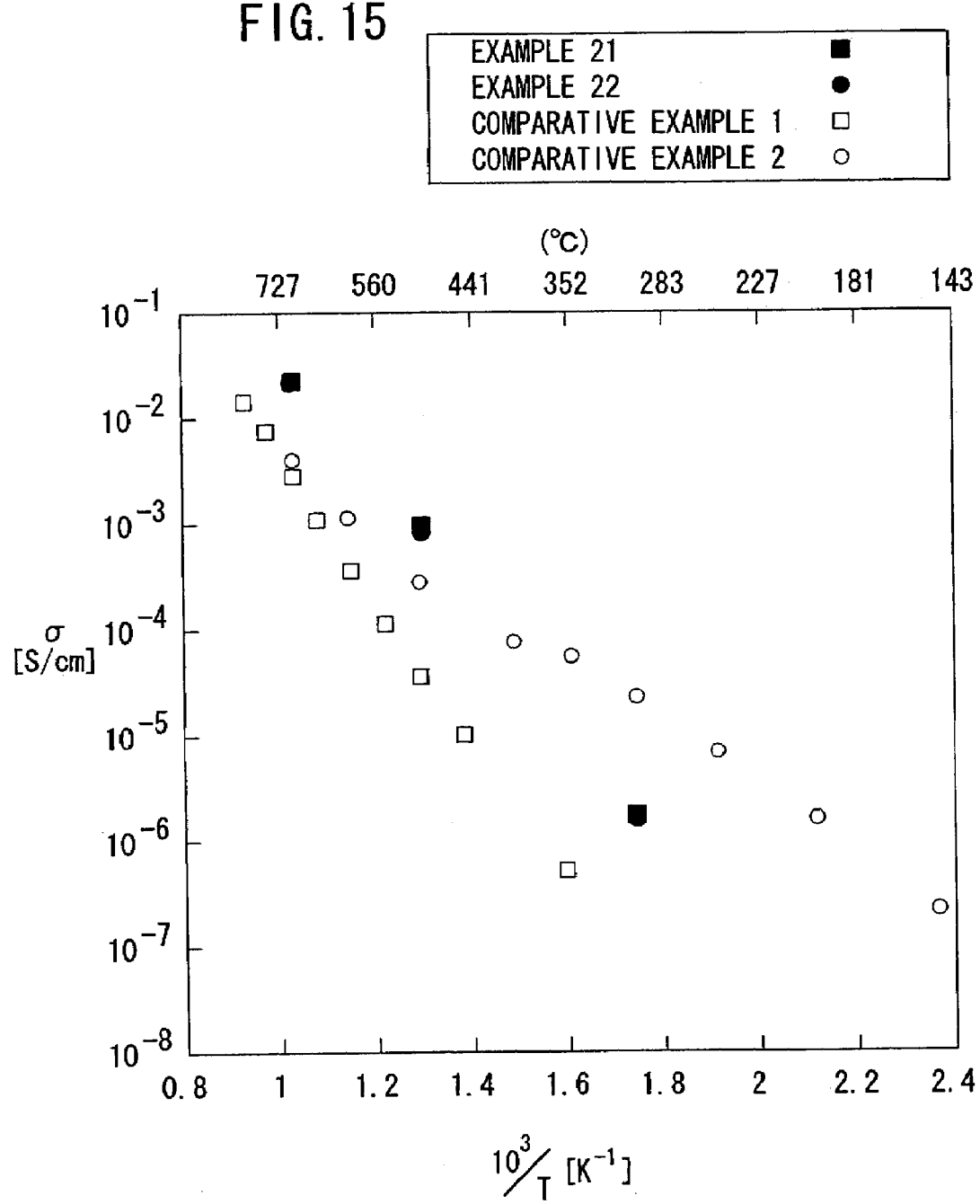

METHOD OF PRODUCING OXIDE ION CONDUCTOR

BACKGROUND OF THE INVENTION

1. Field of the Invention

The present invention relates to an oxide ion conductor and a method of producing the same. In particular, the present invention relates to an oxide ion conductor which is preferably usable as a solid electrolyte of a fuel cell and which is composed of a composite oxide of lanthanum, a tetravalent element, and an element with which at least any one of them is substituted. The present invention also relates to a method of producing the oxide ion conductor.

2. Description of the Related Art

The solid, in which ions are movable, is widely known as an ion conductor. Also, as well known, the ion has the positive or negative electric charge. Therefore, a current flows through the ion conductor when the ions move.

The mobile ion differs depending on the type of the ion conductor. For example, $\beta$-$Al_2O_3$, which has a composition of $Na_2O.11Al_2O_3$, is a good ion conductor for $Na^+$, i.e., a sodium ion conductor, which is adopted as a solid electrolyte of the sodium/sulfur cell. On the other hand, AgI has long been known as a good silver ion conductor from old times.

Recently, because of the growing concern over environmental protection, a fuel cell is used as a low pollution electric power source. Attempts are being made to adopt an oxide ion ($O^{2-}$) conductor as an electrolyte of the fuel cell. In this case, the entire fuel cell can be made of solid materials, for the oxide ion conductor itself is a solid, making the structure simple. Further, the number of times of maintenance can be reduced because no liquid leakage occurs.

A typical crystalline structure of the oxide ion conductor is the fluorite ($CaF_2$) type structure. Examples of such structure include stabilized $ZrO_2$ doped with about 8 mole % of $Y_2O_3$, stabilized $ZrO_2$ doped with about 15 mole % of MgO, $Bi_2O_3$ doped with about 25 mole % of $Y_2O_3$, and $CeO_2$ doped with about 25 mole % of $Gd_2O_3$. In particular, the two types of stabilized $ZrO_2$ described above are practically used as a solid electrolyte of a fuel cell and a partition wall in an oxygen sensor for measuring oxygen concentration in gases or molten metals.

Examples of other oxide ion conductors are those which have the perovskite ($CaTiO_3$) type structure; for example, $La_{0.9}Sr_{0.1}Ga_{0.8}Mg_{0.2}O_3$ and $BaTh_{0.9}Gd_{0.1}O_3$. Usage of these compounds as a partition wall, an oxygen sensor and also a thermistor, is being considered.

The oxide ion conductivity of the oxide ion conductor having the fluorite or the perovskite type structure described above is satisfactory at a high temperature range of about 800 to 1000° C. Therefore, to operate a fuel cell using the oxide ion conductor as a solid electrolyte, it is necessary to raise the temperature of a laminated stack to about 800 to 1000° C. The laminated stack comprises a power generation cell or a plurality of power generation cells electrically connected to one another to constitute the fuel cell. At a temperature lower than the foregoing temperature range, the conductivity of the sold electrolyte (oxide ion conductor) decreases, thus, markedly lowering the power generation efficiency.

When, however, the fuel cell is operated at a high temperature range as described above, a large amount of energy (electric power or the like) is required to heat the power generation cell or the laminated stack. Additionally, inexpensive metal materials, such as stainless steel cannot be used as a member for constituting the fuel cell. The mechanical strength and the corrosion resistance of such a metal material decreases at a high temperature. Therefore, operating the fuel cell at a high temperature significantly increases the running cost.

Both of Japanese Laid-Open Patent Publication Nos. 8-208333 and 11-71169 suggest an oxygen ion conductor composed of a composite oxide of rare earth element(s) and Si, and a method of producing the same. In both of the patent documents, it is described that the composite oxide exhibits excellent oxide ion conductivities at low and middle temperature range of 200 to 600° C., as compared with the two types of the oxide ion conductors described above.

Further, in Solid State Ionics 136–137 (2000 edition), pp. 31–37, studies are made on $La_{10}Si_6O_{27}$, $La_{10}Ge_6O_{27}$ and composite oxides obtained by substituting a part of La with Sr of the two. It is reported that these composite oxides also exhibit excellent oxide ion conductivities in the temperature range of 200 to 600° C. as compared with the two types of the oxide ion conductors described above.

Generally, to produce an oxide ion conductor composed of a composite oxide of a rare earth element and Si, the composite oxide of rare earth elements and Si are sintered at a temperature exceeding 1700° C. This is because the melting point of the foregoing composite oxide is high, and the sintering process is insufficient at a temperature lower than 1700° C. In other words, it is difficult to obtain a sintered product (oxide ion conductor) at a temperature lower than 1700° C., which is strong enough for practical use.

When, however, parts of the reactor, which are used for sintering, such as the heating element, heat insulating material and reaction tube, are heated up to a temperature exceeding 1700° C., the durability rapidly falls. That is, the life of the reactor is drastically shortened and the equipment cost is extremely expensive for producing the oxide ion conductor composed of the composite oxide of rare earth elements and Si. Consequently, the expensive production cost of the oxide ion conductor is a great drawback.

In the scientific paper described above, $La_{10}Ge_6O_{27}$ and $La_{10-x}Sr_xGe_6O_{27}$, in which a part of La is substituted with Sr, are obtained by isostatically pressing a mixed powder of $GeO_2$, $SiO_2$, and $SrCO_3$ at 275 Mpa, and then sintering in a temperature range of 1600 to 1650° C.

However, large amounts of impurities such as $La_2GeO_5$ and $La_2Ge_2O_7$ are contained in the products of $La_{10}Ge_6O_{27}$ and $La_{10-x}Sr_xGe_6O_{27}$ obtained from above described procedure. The oxide ion conductivities of the oxide ion conductors containing such impurities are extremely low at low through middle range temperatures as compared with the oxide ion conductivity of the pure oxide ion conductor. The conductivity of the oxide ion cannot be improved, because the impurities in the composite oxides of lanthanum and germanium having the same compositions as described above.

SUMMARY OF THE INVENTION

A principal object of the present invention is to provide an oxide ion conductor, and a method of producing the same, which is excellent in oxide ion conductivity at a middle temperature range of 500 to 700° C. Such an oxide ion conductor makes it possible to lower the operating temperature for a fuel cell or the like.

Another object of the present invention is to provide an oxide ion conductor composed of a composite oxide containing:

lanthanum, a tetravalent element A, and at least one of a divalent or tetravalent element X with which the lanthanum is substituted and a trivalent or pentavalent element Z with which the element A is substituted, wherein the composite oxide has a composition formula which is represented by $La_lX_m(AO_4)_{6-n}(ZO_4)_nO_p$ provided that $8 \leq l+m < 10$, $0 \leq m \leq 2$, $0 \leq n \leq 2$, $0 \leq p \leq 2$, and wherein the composite oxide has a crystalline structure which belongs to an apatite type structure.

The oxide ion conductor according to the present invention may be either $La_lX_m(AO_4)_6O_p$ (s=l+m) in which a part of La of $La_s(AO_4)_6O_p$ ($8 \leq s < 10$, $0 \leq p \leq 2$) is substituted with the element X, or $La_s(AO_4)_{6-n}(ZO_4)_nO_p$ (in this case $0 < n \leq 2$ because of m=0) in which a part of the element A is substituted with the element Z. Alternatively, the oxide ion conductor according to the present invention may be $La_lX_m(AO_4)_{6-n}(ZO_4)_nO_p$ in which a part of La is substituted with the element X, and a part of the element A is substituted with the element Z. In the present invention, as described above, m and n are not simultaneously zero, which applies to all embodiments.

Still another object of the present invention is to provide a method of producing an oxide ion conductor, comprising the steps of:

obtaining a mixed powder in which a lanthanum compound, a compound of a tetravalent element A, and at least one of a compound of a divalent or tetravalent element X and a compound of a trivalent or pentavalent element Z, are mixed in a ratio to produce $La_lX_m(AO_4)_{6-n}(ZO_4)_nO_p$ provided that $8 \leq l+m < 10$, $0 \leq m \leq 2$, $0 \leq n \leq 2$, $0 \leq p \leq 2$;

forming the mixed powder to obtain a formed product; and sintering the formed product to obtain the oxide ion conductor having an apatite crystalline structure and a composition formula which is represented by $La_lX_m(AO_4)_{6-n}(ZO_4)_nO_p$ provided that $8 \leq l+m < 10$, $0 \leq m \leq 2$, $0 \leq n \leq 2$, $0 \leq p \leq 2$.

Still another object of the present invention is to provide a method of producing an oxide ion conductor, comprising the steps of:

obtaining a mixed powder in which a lanthanum compound, a compound of a tetravalent element A, and at least one of a compound of a divalent or tetravalent element X and a compound of a trivalent or pentavalent element Z are mixed in a ratio to produce $La_lX_m(AO_4)_{6-n}(ZO_4)_nO_p$ provided that $8 \leq l+m < 10$, $0 \leq m \leq 2$, $0 \leq n \leq 2$, $0 \leq p \leq 2$;

heating the mixed powder to obtain a granular material of a composite oxide of lanthanum and germanium having an apatite crystalline and a composition formula which is represented by $La_lX_m(AO_4)_{6-n}(ZO_4)_nO_p$ provided that $8 \leq l+m < 10$, $0 \leq m \leq 2$, $0 \leq n \leq 2$, $0 \leq p \leq 2$;

pulverizing the granular material to obtain a composite oxide powder;

forming the composite oxide powder to obtain a formed product; and sintering the formed product to obtain the oxide ion conductor composed of the composite oxide. The granular material referred to herein is an aggregate of powder cohered or bonded so that the aggregate is capable of being pulverized in the pulverizing step.

BRIEF DESCRIPTION OF THE DRAWINGS

FIG. 2 shows a flow chart illustrating a method (first production method) for producing an oxide ion conductor according to a first embodiment;

FIG. 4 shows a table illustrating mixing ratios of raw material powders and compositions of obtained oxide ion conductors in Examples 1 to 10 and Comparative Examples 1 and 2;

FIG. 7 shows a table illustrating mixing ratios of raw material powders and compositions of obtained oxide ion conductors in Examples 11 to 14;

FIG. 10 shows a table illustrating mixing ratios of raw material powders and compositions of obtained oxide ion conductors in Examples 15 to 18;

FIG. 13 shows a table illustrating mixing ratios of raw material powders and compositions of obtained oxide ion conductors in Examples 19 to 22;

FIG. 15 shows a graph illustrating the relationship between the oxide ion conductivity and the temperature in relation to the oxide ion conductors of Examples 21 and 22 and Comparative Examples 1 and 2.

DESCRIPTION OF THE PREFERRED EMBODIMENTS

The oxide ion conductor and the method of producing the same according to the present invention will be explained in detail below with reference to the accompanying drawings as exemplified by preferred embodiments.

Figure 1:
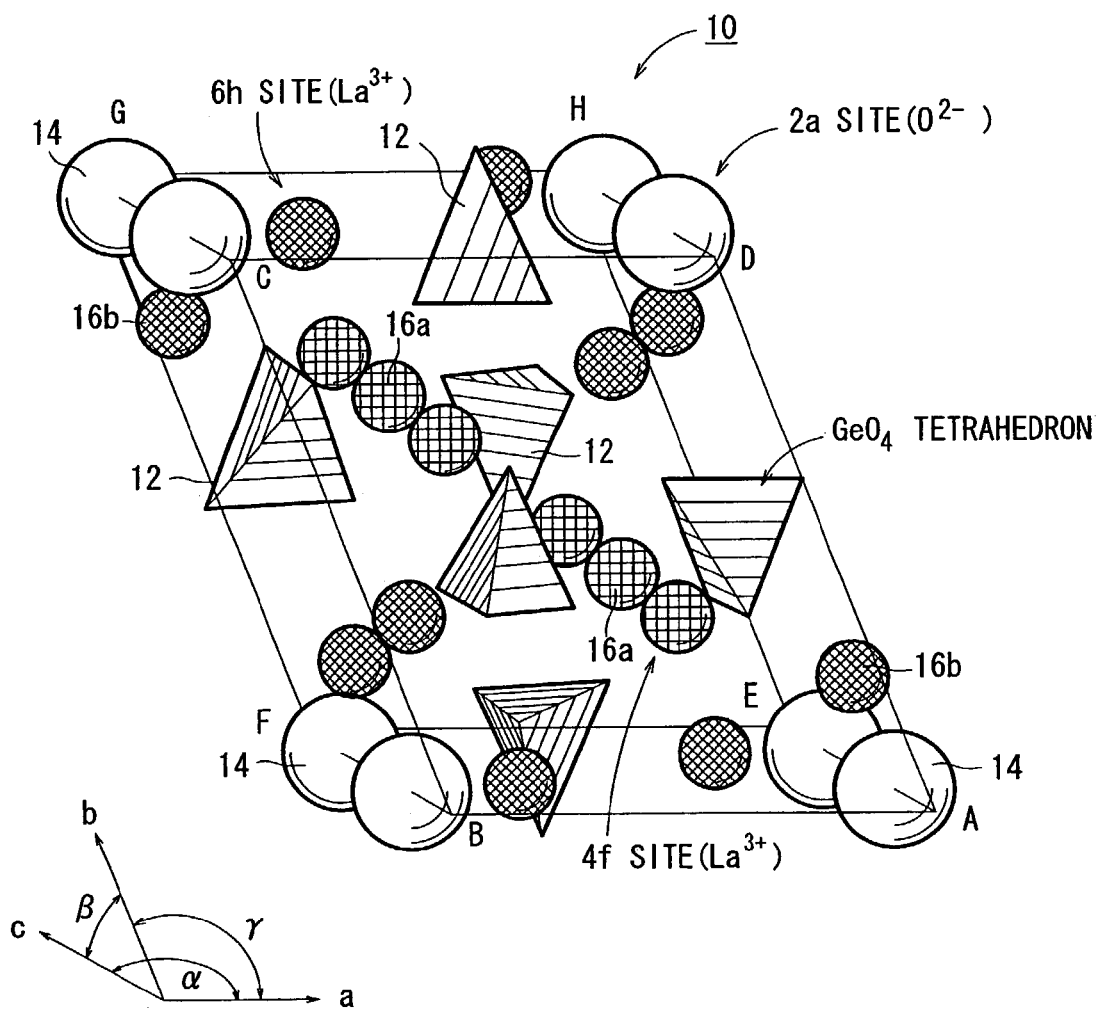
FIG. 1 shows a schematic structure of a unit lattice of $La_s(GeO_4)_6O_p$ ($8 \leq s < 10$, $0 \leq p \leq 2$) as an oxide ion conductor.

At first, FIG. 1 shows the structure of the unit lattice of $La_s(GeO_4)_6O_p$ (wherein $8 \leq s < 10$, $0 \leq p \leq 2$) as viewed in the c-axis direction. The unit lattice 10 has the apatite type structure including six $GeO_4$ tetrahedrons 12, $O^{2-}$ 14 occupying the 2a sites, and $La^{3+}$ 16a, 16b occupying the 4f sites and the 6h sites respectively. $Ge^{4+}$ and $O^{2-}$ of the $GeO_4$ tetrahedron 12 are not shown.

The crystal system of the unit lattice 10 belongs to the hexagonal system. In FIG. 1, angle α is formed at the intersection of side AB in the a-axis direction and side BF is the c-axis direction of the unit lattice 10. Angle β is formed at the intersection of side BC in the b-axis direction and side BF, and angle γ, at the intersection of sides AB and BC. The angles α, β, γ are 90°, 90°, and 120° respectively. The length of side AB is equal to the length of side BC. Further, the lengths sides AB, BC differ from the length of side BF.

The hexagonal crystal lattice (not shown), in which the unit lattice 10 is included, is a simple lattice. When the hexagonal crystal lattice makes a ⅓ rotation around a virtual screw axis (not shown), and translates along the screw axis by half the length of side BF, the positions of each ion synchronizes exactly with the positions before the displacement. Further, the mirror plane of the hexagonal crystal lattice is perpendicular to the screw axis. Namely, when the space group of the crystal of $La_s(GeO_4)_6O_p$ ($8 \leq s < 10$, $0 \leq p \leq 2$) is symbolized by a Hermann-Mauguin symbol $P6_3/m$.

An oxide ion conductor according to an embodiment of the present invention is a composite oxide containing an element with which at least one of $La^{3+}$ 16a, $La^{3+}$ 16b and Ge in the $GeO_4$ tetrahedron 12 of the unit lattice 10 is substituted. That is, when X represents the element existing after the substitution of $La^{3+}$ 16a and/or $La^{3+}$ 16b and Z represents the element existing after the substitution of Ge therewith, the composition formula of the composite oxide is $La_lX_m(GeO_4)_{6-n}(ZO_4)_nO_p$. In this composition formula, $8 \leq l+m < 10$, $0 \leq m \leq 2$, $0 \leq n \leq 2$, $0 \leq p \leq 2$, and m and n are not simultaneously zero.

As described above, only one of the elements X, Z may be present in the composite oxide. Therefore, the oxide ion conductor (composite oxide) according to the embodiment of the present invention includes $La_s(GeO_4)_{6-n}(ZO_4)_nO_p$ (m=0), which does not contain element X, and $La_lX_m(GeO_4)_6O_p$ (n=0), which does not contain element Z.

The structure and the crystal system of the unit lattice of the composite oxide containing the elements X, Z as described above, and have the apatite type structure and the hexagonal system like the unit lattice 10. Therefore, the space group of the crystal of the composite oxide is also symbolized by a Hermann-Mauguin symbol $P6_3/m$.

The reason why $La_lX_m(GeO_4)_{6-n}(ZO_4)_nO_p$ having the apatite type structure is an excellent oxide ion conductor, seems to be that $O^{2-}$ 14 occupying the 2a site, does not bond with the $GeO_4$ tetrahedron 12, $La^{3+}$ 16a or $La^{3+}$ 16a. Since the force exerted on $O^{2-}$ 14 is not strong, $O^{2-}$ 14 can move relatively freely in the c-axis direction without being constrained to the 2a site.

On the other hand, composite oxides containing La, Ge, X, and Z which do not have the apatite type crystalline structure, have low oxide ion conductivities for the following reason. The unit lattice of such a composite oxide has a different structure from that of the unit lattice 10 described above. Therefore, $O^{2-}$, which can move freely like O2– 14 in the unit lattice 10, described above, do not exist.

In view of the above, in the oxide ion conductor according to the embodiment of the present invention, the sum of l and m in $La_lX_m(GeO_4)_{6-n}(ZO_4)_nO_p$ is set to be 8 or more but less than 10. If (l+m) is less than 8, the crystalline structure does not form the apatite type structure, and hence the oxide ion conductivity is lowered. On the other hand, if (l+m) is not less than 10, composite oxides having a different structure like impurities such as $La_2GeO_5$ are contained in the composite oxide having the apatite type structure; therefore the oxide ion conductivity is also lowered.

In particular, it is preferable that $8 \leq l+m \leq 9.33$ for the following reason. In this state, a large majority of $La_lX_m(GeO_4)_{6-n}(ZO_4)_nO_p$ crystals have the apatite type structure (see FIG. 1), and hardly any impurity phase having any other structure is produced. Therefore, the oxide ion conductivity of the composite oxide is the heightened. Especially when the value of l+m is 9.33, the oxide ion conductivity is the highest.

Further, the unit lattice of the crystal of $La_lX_m(GeO_4)_{6-n}(ZO_4)_nO_p$ is slightly strained as compared with the unit lattice 10 of the crystal of $La_s(GeO_4)_6O_p$, because of the presence of the element X or the element Z. Accordingly, the distance between the 2a sites of an arbitrary unit lattice of the composite oxide and a neighboring unit lattice is narrowed. Therefore, $O^{2-}$ 14 occupying the 2a site can move with ease in the c-axis direction between the unit lattices. Accordingly, the composite oxide exhibits excellent oxide ion conductivity.

The composite oxide exhibits excellent oxide ion conductivity at a middle temperature range of 500 to 700° C. Therefore, for example, with a fuel cell provided with the composite oxide as a solid electrolyte according to the embodiment of the present invention, equivalent power generation characteristics are obtained even when the fuel cell is operated at a low temperature, as compared with the conventional fuel cell. Therefore, it is possible to decrease the running cost of the fuel cell.

The element X is not specifically limited provided that the element X is a divalent or tetravalent element and has an ionic radius capable of maintaining the apatite type structure when $La^{3+}$ 16a and/or $La^{3+}$ 16b is substituted. Preferred examples of the element X include Sr (divalent) and Zr (tetravalent).

The element Z is not specifically limited provided that the element Z is a trivalent or pentavalent element and has an ionic radius capable of maintaining the apatite type structure when $Ge^{4+}$ is substituted. Preferred examples of the element Z include Al (trivalent) and P (pentavalent).

Next, the method of producing the composite oxide will be explained.

A method of producing the composite oxide according to a first embodiment (referred to as "first production method") will be explained with reference to a flow chart shown in FIG. 2 in which Sr is selected as the element X and strontium carbonate is used as an Sr source to prepare $La_lSr_m(GeO_4)_6O_p$. The first production method comprises a step S1 of mixing a lanthanum oxide powder, a germanium oxide powder, and a strontium carbonate powder to obtain a mixed powder, a step S2 of forming the mixed powder to obtain a formed product, and a step S3 of sintering the formed product to produce the composite oxide (sintered product).

Firstly, in step S1, the lanthanum oxide ($La_2O_3$) powder, the germanium oxide ($GeO_2$) powder, and the strontium carbonate ($SrCO_3$) powder are mixed.

The ratio of the $La_2O_3$ powder, the $GeO_2$ powder, and the $SrCO_3$ powder is set so that the crystals of $La_lSr_m(GeO_4)_6O_p$ have the apatite type structure; in other words, the values of l, m, p satisfy $8 \leq l+m < 10$, $0 < m \leq 2$, $0 \leq p \leq 2$. For example, when producing a composite oxide having a composition represented by $La_{8.93}Sr_{0.1}(GeO_4)_6O_1$., the following ratio is set; $La_2O_3$ powder:$GeO_2$ powder:$SrCO_3$ powder=44.65:60:1 (numerals are expressed by molar ratios).

Secondly, in step S2, the mixed powder is formed. The forming method in this process is not limited to any specified method. It is possible to adopt forming methods including, for example, by press forming, slurry casting, and extruding. The shape of the formed product may be of any shape depending on the use.

Subsequently, in step S3, the $La_2O_3$ powder, the $GeO_2$ powder, and the $SrCO_3$ powder are subjected to grain growth by sintering the formed product. That is, the junctions of contacting particles or grains grow to combine into large particles or grains. Further, $La_2O_3$, $GeO_2$, and $SrCO_3$ form the solid solution to obtain the composite oxide represented by $La_lSr_m(GeO_4)_6O_p$. Accordingly, the sintered product, i.e., the composite oxide as the oxide ion conductor is produced.

It is preferable that the sintering temperature is within the range of 1400 to 1700° C. for the following reason. If the sintering temperature is less than 1400° C., the grain growth does not progress efficiently. On the other hand, if the temperature exceeds 1700° C., the durability of the heating element, the heat insulating material, and the reaction tube of the reactor used for the sintering operation, is drastically lowered. The sintering temperature range of 1450 to 1600° C. is preferred over the foregoing temperature range, and the most preferred temperature is 1500° C.

As described above, in the first production method, the sintering temperature, at which $La_lSr_m(GeO_4)_6O_p$ is obtained, is lower than the sintering temperature at which $La_{10}Si_6O_{27}$ as the oxide ion conductor in the conventional art is obtained. Accordingly, it is possible for the reactor to have a long life span, and to reduce the production cost.

Further, because the ratios of the $La_2O_3$ powder, the $GeO_2$ powder, and the $SrCO_3$ powder are set as described above, the apatite type structure is obtained, in which the crystals belong to the hexagonal system whose space group is symbolized by $P6_3/m$. Therefore, $La_lSr_m(GeO_4)_6O_p$ can exhibit excellent oxide ion conductivity.

The crystalline structure of $La_2O_3$, $GeO_2$, and $SrCO_3$ and $La_lSr_m(GeO_4)_6O_p$ is different from each other. For example, the crystalline structure of $La_2O_3$ differs greatly from the apatite type structure. Therefore, as in the first production method, when the formed product is directly sintered to simultaneously enhance change of the crystalline structure brought about by forming the solid solution of $La_2O_3$ and $GeO_2$ and the grain growth, any of the changes of the crystalline structure and grain growth will not be enhanced sufficiently, if the driving force in the sintering process is small. Accordingly, as explained below, it is desirable that the step of mutually forming the solid solution of $La_2O_3$ and $GeO_2$ is distinct from the step of affecting the grain growth.

Figure 3:
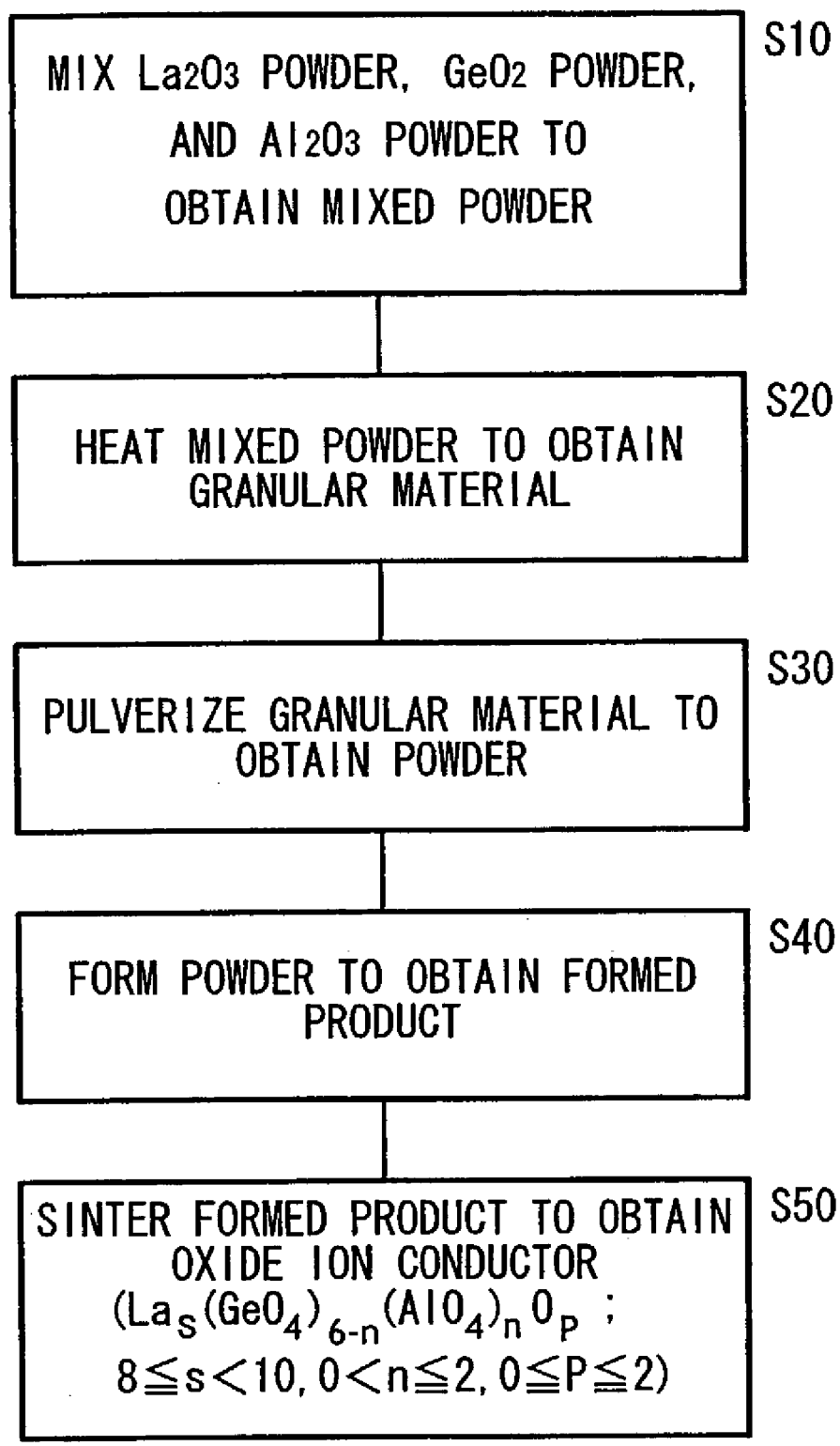
FIG. 3 shows a flow chart illustrating a method (second production method) for producing an oxide ion conductor according to a second embodiment.

A method of producing the composite oxide according to a second embodiment (referred to as "second production method") will be explained with reference to a flow chart shown in FIG. 3 in which Al is selected as the element Z and aluminum oxide is used as an Al source to prepare $La_s(GeO_4)_{6-n}(AlO_4)_nO_p$.

The second production method comprises a step S10 of mixing an $La_2O_3$ powder, a $GeO_2$ powder, and an $Al_2O_3$ powder to obtain a mixed powder, a step S20 of heat-treating the mixed powder to obtain a granular material of a composite oxide of lanthanum and germanium, a step S30 of pulverizing the granular material to obtain a composite oxide powder, a step S40 of forming the composite oxide powder to obtain a formed product, and a step S50 of sintering the formed product to obtain the composite oxide.

Firstly, in the step S10, the $La_2O_3$ powder, the $GeO_2$ powder, and the $Al_2O_3$ powder are mixed in accordance with the mixing step S1 of the first production method. In this procedure, the ratio of the respective powders are set so that the crystals of $La_s(GeO_4)_{6-n}(AlO_4)_nO_p$ have the apatite type structure, in other words, the values of s, n, p satisfy $8 \leq s < 10$, $0 < n \leq 2$, $0 \leq p \leq 2$. For example, when a composite oxide having a composition represented by $La_9(GeO_4)_5(AlO_4)O_{1.0}$ is obtained, the ratio is set to be $La_2O_3$ powder: $GeO_2$ powder:$Al_2O_3$ powder=9:10:1 (numerals are expressed by molar ratios).

Secondly, in step S20, the mixed powder is heated, and thus the powders are fused so that the obtained product is capable of being pulverized. In other words, the powders are aggregated or bonded to obtain a granular material so that the pulverization can be performed. If, at this point, the sintered product is dense, it is extremely difficult to carry out the pulverization.

The heat treatment temperature in the step S20 is set so that there is no conspicuous grain growth of the mixed powder. In this procedure, the $La_2O_3$ powder, the $GeO_2$ powder, and the $Al_2O_3$ powder are used. Therefore, the temperature range is sufficient at 700 to 1200° C., preferably 1000° C.

During this process, $La_2O_3$, $GeO_2$, and $Al_2O_3$ form a solid solution. That is, at this point in the second production method, $La_s(GeO_4)_{6-n}(AlO_4)_nO_p$ is produced. The heat treatment in step S20 is performed until the production of $La_s(GeO_4)_{6-n}(AlO_4)_nO_p$ is completed. Specifically, the heat treatment may be performed for about 2 hours. The values of s, n, p, are given as $8 \leq s < 10$, $0 < n \leq 2$, $0 \leq p \leq 2$.

When the heat treatment for the mixed powder is performed at the foregoing temperature range for the foregoing period of time, the aggregation force or the bonding force of the obtained granular material of $La_s(GeO_4)_{6-n}(AlO_4)_nO_p$ need not be so strong. The strength is such that the granular material can be pulverized easily with a mortar.

Subsequently, in step S30, the granular material of $La_s(GeO_4)_{6-n}(AlO_4)_nO_p$ is pulverized to obtain a powder. The pulverization method is not specifically limited. The pulverization may be performed with a mortar; however, it is preferable to use a method such as ball milling in which the particle diameter of the powder can be substantially uniformed. Accordingly, hardly any pores remain in the sintered product, and it is possible to obtain an oxide ion conductor with excellent strength and toughness.

Next, in step S40, a formed product is prepared in accordance with step S2 of the first production method.

Finally, in step S50, the formed product is sintered in accordance with step S3 to obtain the oxide ion conductor. Also in the second production method, the sintering temperature is preferably in the range of 1400 to 1700° C. and more preferably 1450 to 1600° C. as in step S3. The sintering temperature is most preferably 1500° C.

In the second production method, the step (step S20) of forming the solid solution of $La_2O_3$, $GeO_2$, and $Al_2O_3$ and the step (step S50) of affecting the grain growth are performed separately. Therefore, the driving force required for the structural change of the crystals and the driving force required for the grain growth are decreased. Thus, it is possible to obtain a composite oxide in which $La_s(GeO_4)_{6-n}(AlO_4)_nO_p$ having the apatite type structure is homogeneously produced within the entire product. That is, in this procedure, there is no decrease of the oxide ion conductivity, which would otherwise be caused by the production of any composite oxide having a structure other than the apatite type structure.

Further, when the granular material is pulverized in the step S30 so that the particle diameters are substantially uniformed, the oxide ion conductor will be made of a dense sintered product, even when the particle diameter differs greatly among the $La_2O_3$ powder, the $GeO_2$ powder, and the $Al_2O_3$ powder. Such a dense sintered product has a strength and toughness for sufficient practical use.

According to the first and second production methods as described above, $La_l(GeO_4)_{6-n}(AlO_4)_nO_p$, with the apatite crystalline structure and hence the excellent oxide ion conductivity, is obtained with ease by performing the sintering operation after mixing the raw material powders in the predetermined ratios and performing the forming operation. Further, it is possible to reduce the production cost of the oxide ion conductor, because the sintering temperature will not exceed 1700° C.

When an oxide ion conductor, which is composed of $La_lSr_m(GeO_4)_{6-n}(AlO_4)_nO_p$ containing both Sr and Al, is prepared, then an $La_2O_3$ powder, a $GeO_2$ powder, an $SrCO_3$ powder, and an $Al_2O_3$ powder may be used as raw materials, and the respective powders may be mixed in a ratio so that crystals have the apatite type structure.

In the first and second production methods described above, the forming steps S2, S40 and the steps S3, S50 are performed individually. However, the forming and the sintering may be performed simultaneously by adopting the hot press method or the hot isostatic pressing (HIP) method.

In the first and second production methods, the mixed powder is obtained by mixing the lanthanum oxide powder and the germanium oxide powder. However, the mixed powder may be obtained by using a powder of a substance other than oxide. For example, the carbonate of lanthanum and carbonate of germanium can be used.

The mixed powder, which contains lanthanum, germanium, and oxygen, may be obtained by performing the sol-gel method, the CVD method, or the spray pyrolysis method. In this case, various conditions may be controlled to prepare a mixed powder with $La_lX_m(AO_4)_{6-n}(ZO_4)_nO_p$ ($8 \leq l+m < 10$, $0 \leq m \leq 2$, $0 \leq n \leq 2$, $0 \leq p \leq 2$). Also, a powder other than oxide may be prepared.

EXAMPLES 34.75 g of a $La_2O_3$ powder, 14.9 g of a $GeO_2$ powder, and 0.35 g of an $SrCO_3$ powder were mixed for 16 hours in a wet ball mill with a 100 g solvent of ethyl alcohol. 500 g of balls made of $ZrO_2$ were used in the ball mill. After that, the solvent was removed by using a rotary evaporator to obtain a mixed powder.

Subsequently, a crucible made of $Al_2O_3$, in which the mixed powder was accommodated, was arranged in a reaction furnace. The mixed powder was heated in an atmospheric air at 1000° C. for 2 hours to obtain a granular material. The granular material was pulverized by using a wet ball mill under the same condition as above.

The powder was formed into a disk member having a diameter of 12 mm and a thickness of 3 mm by die pressing and the isostatic forming method. After that, the disk member was placed on a jig composed of a stabilized $ZrO_2$ sintered member and arranged in a reaction furnace. Then, the disk member was sintered at 1500° C. for 2 hours in an atmospheric atmosphere to obtain an oxide ion conductor composed of a sintered product of $La_{8.93}Sr_{0.1}(GeO_4)_6O_{1.5}$ with the apatite crystalline structure. This product is designated as Example 1.

Further, oxide ion conductors with various compositions were obtained in accordance with Example 1, except that the $La_2O_3$ powder, the $GeO_2$ powder, and the $SrCO_3$ powder were mixed in weights shown in FIG. 4. These products are designated as Examples 2 to 10. FIG. 4 also shows respective values of l, m, p of the oxide ion conductors $La_lSr_m(GeO_4)_6O_p$ of Examples 1 to 10.

For the purpose of comparison, 36.16 g of the $La_2O_3$ powder and 7.99 g of the $GeO_2$ powder were mixed, and then an oxide ion conductor composed of a sintered product of $La_{10}Ge_6O_{27}$ was obtained in accordance with Example 1. This product is designated as Comparative Example 1. Further, an oxide ion conductor composed of a sintered product of $La_{10}Si_6O_{27}$ was prepared. This product is designated as Comparative Example 2. The sizes of the oxide ion conductors of Comparative Examples 1 and 2 were set to be the same as those of the oxide ion conductors of Examples 1 to 10.

The oxide ion conductivities of each oxide ion conductors in Examples 1 to 10 and Comparative Examples 1 and 2 described above were measured. That is, the sintered product was ground until its thickness was 2 mm, and then a Pt paste was applied to the both end surfaces so that the diameter was 6 mm. Pt lead wires each having a diameter of 0.1 mm were arranged on the Pt paste. Subsequently, the Pt paste was retained and dried under a temperature of 120° C. for 1 hour, then connected by firing under 700° C. for 2 hours.

Figure 5:
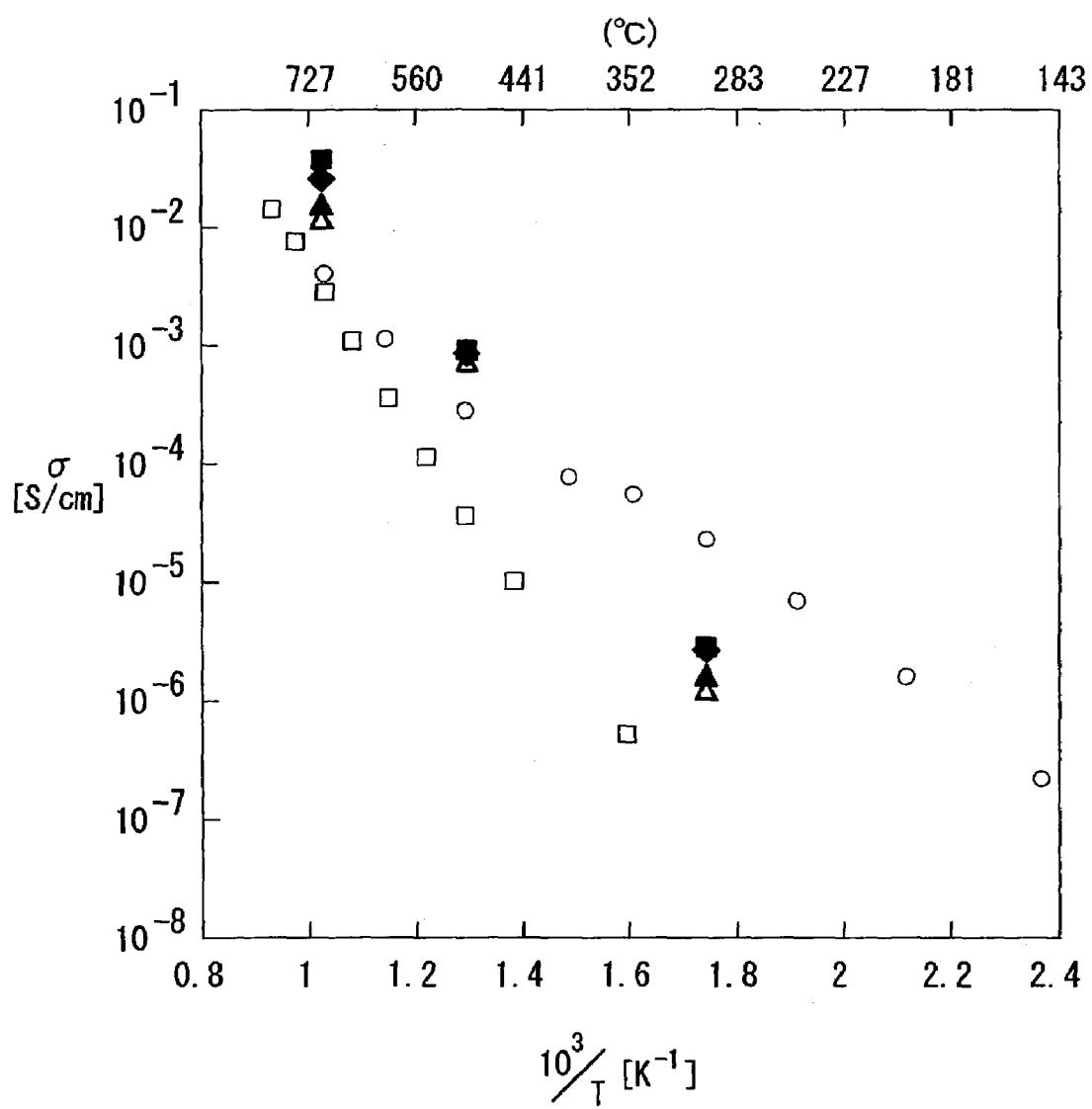
FIG. 5 shows a graph illustrating the relationship between the oxide ion conductivity and the temperature in relation to the oxide ion conductors of Examples 1 to 5 and Comparative Examples 1 and 2.

The Pt lead wires were connected to an Impedance Analyzer 4192A produced by Hewlett Packard, and the alternating current impedance was measured at frequencies of 5 Hz to 13 MHz. The oxide ion conductivity was calculated from the results of the measurement. Results are shown as functions of the temperature in FIGS. 5 and 6. FIG. 5 is illustrative of the comparisons between Examples 1 to 5 and Comparative Examples 1 and 2, and FIG. 6 is illustrative of the comparisons between Examples 6 to 10 and Comparative Examples 1 and 2.

Figure 6:
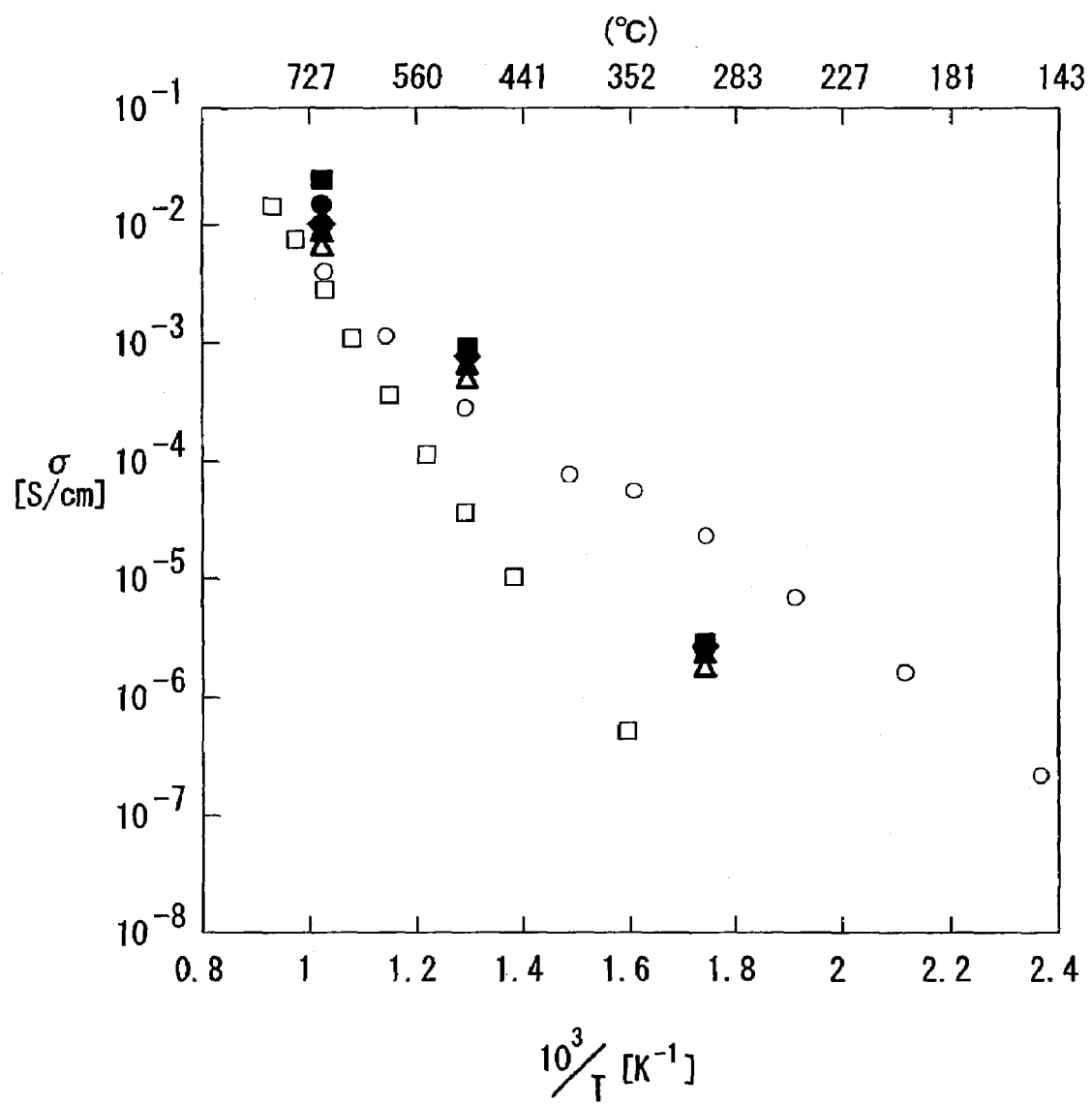
FIG. 6 shows a graph illustrating the relationship between the oxide ion conductivity and the temperature in relation to the oxide ion conductors of Examples 6 to 10 and Comparative Examples 1 and 2.

According to FIGS. 5 and 6, it is clear that the oxide ion conductivities of the oxide ion conductors of Examples 1 to 10 are higher than those of the oxide ion conductors of Comparative Examples 1 and 2, when the temperature is not less than 500° C. It can be analyzed that products, such as $La_{10}Ge_6O_{27}$ in which La is 10 and above, cannot retain the apatite type structure.

Next, oxide ion conductors having various compositions were obtained in accordance with Example 1, except the $La_2O_3$ powder, the $GeO_2$ powder, and a $ZrO_2$ powder were mixed in weights shown in FIG. 7. These products are designated as Examples 11 to 14 respectively. FIG. 7 also shows respective values of l, m, p of oxide ion conductors $La_lZr_m(GeO_4)_6O_p$ of Examples 11 to 14.

Figure 8:
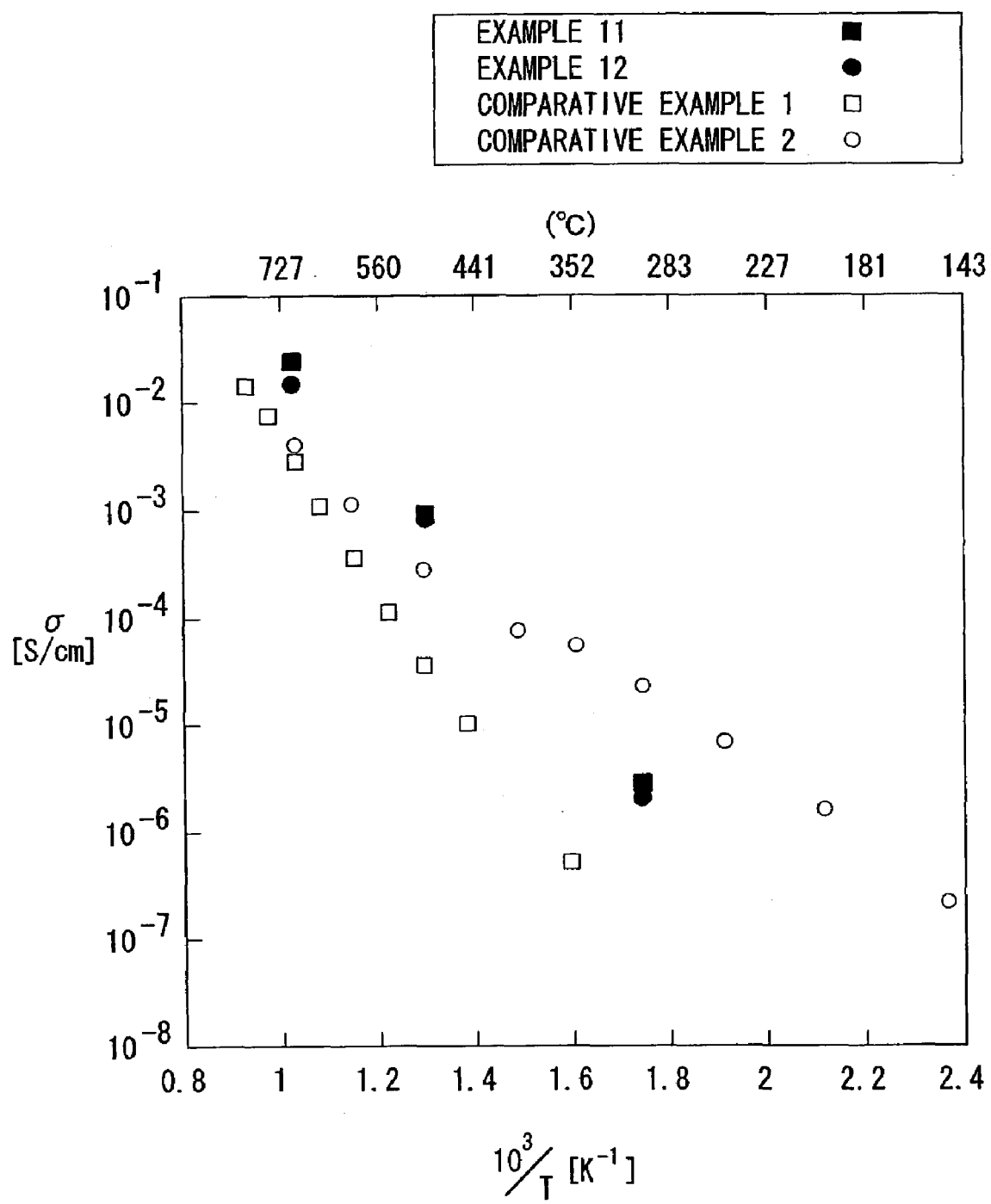
FIG. 8 shows a graph illustrating the relationship between the oxide ion conductivity and the temperature in relation to the oxide ion conductors of Examples 11 and 12 and Comparative Examples 1 and 2.
Figure 9:
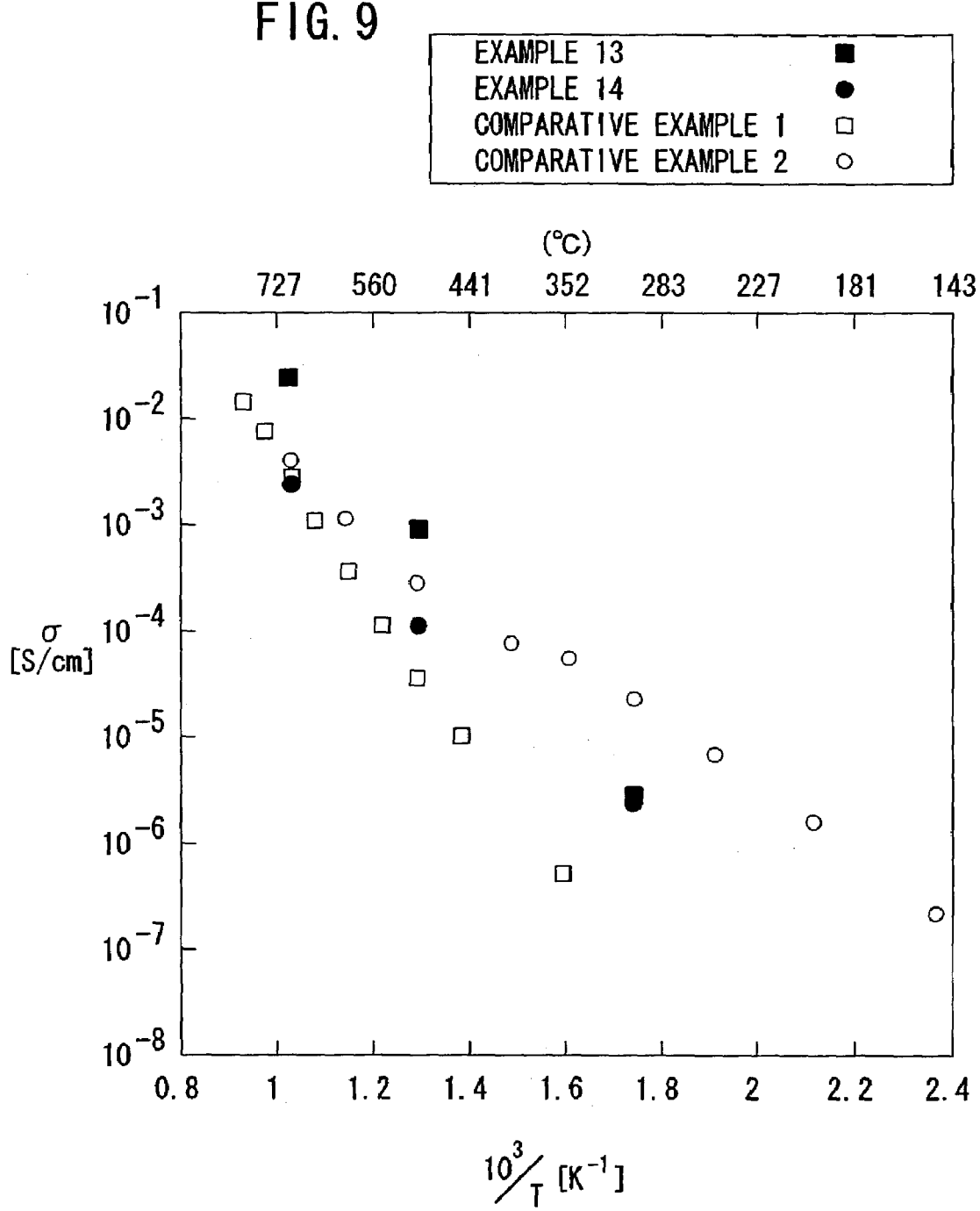
FIG. 9 shows a graph illustrating the relationship between the oxide ion conductivity and the temperature in relation to the oxide ion conductors of Examples 13 and 14 and Comparative Examples 1 and 2.

The oxide ion conductivities of the oxide ion conductors of Examples 11 to 14 were calculated in the same manner as described above. Results are shown as functions of the temperature in FIGS. 8 and 9. FIG. 8 is illustrative of the comparison between Examples 11 and 12 and Comparative Examples 1 and 2. FIG. 9 is illustrative of the comparison between Examples 13 and 14 and Comparative Examples 1 and 2. According to FIGS. 8 and 9, it is clear that the oxide ion conductivities of the oxide ion conductors of Examples 11 to 13 are also higher than those of the oxide ion conductors of Comparative Examples 1 and 2, when the temperature is not less than 500° C., and that the oxide ion conductor of Example 14 has the oxide ion conductivity substantially equivalent to those of the oxide ion conductors of Comparative Examples 1 and 2.

Further, oxide ion conductors having various compositions were obtained in accordance with Example 1 except that the $La_2O_3$ powder, the $GeO_2$ powder, and an $Al_2O_3$ powder were mixed in weights shown in FIG. 10. These products are designated as Examples 15 to 18 respectively.

FIG. 10 also shows respective values of s, 6-n, n, p of the oxide ion conductors $La_s(GeO_4)_{6-n}(AlO_4)_nO_p$ of Examples 15 to 18.

Figure 11:
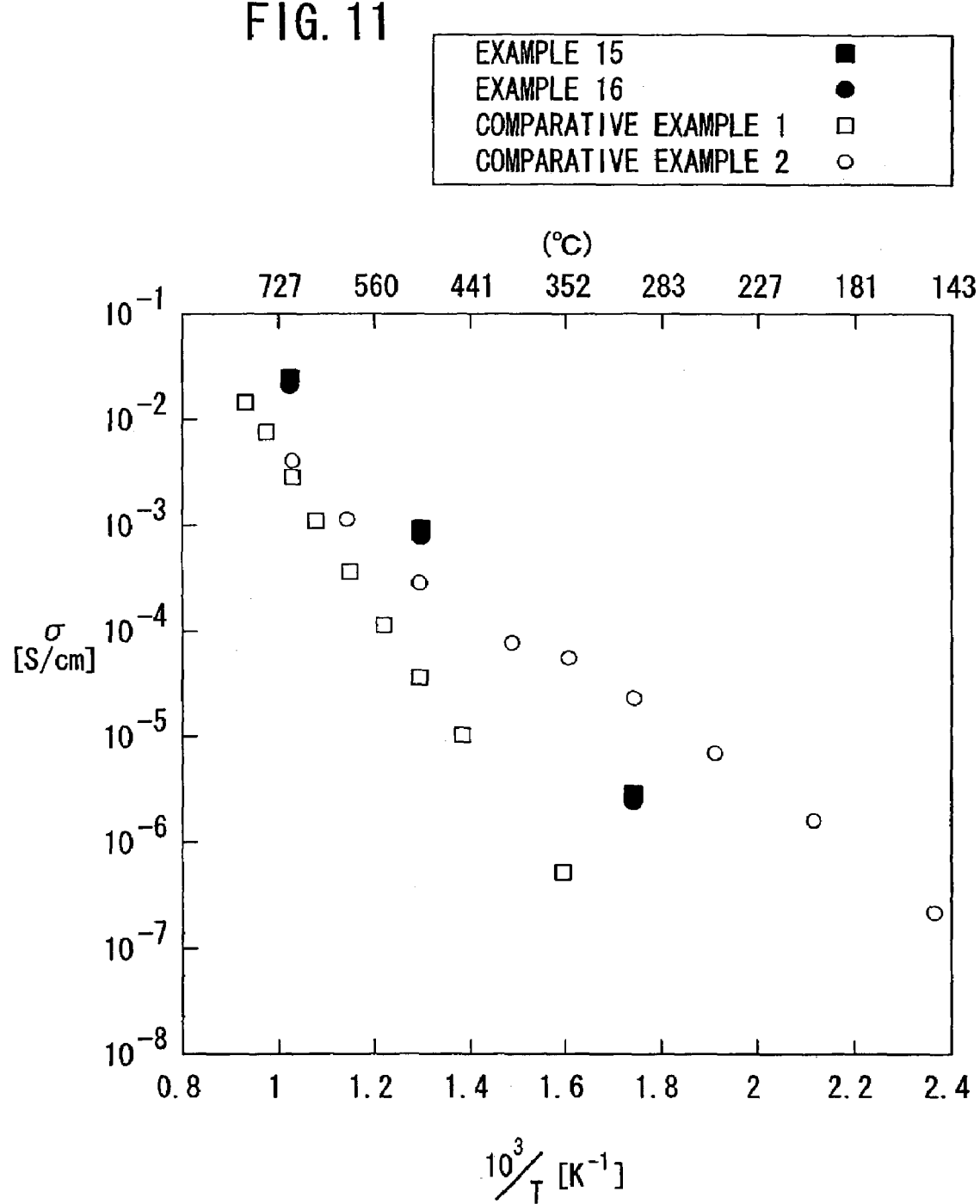
FIG. 11 shows a graph illustrating the relationship between the oxide ion conductivity and the temperature in relation to the oxide ion conductors of Examples 15 and 16 and Comparative Examples 1 and 2.
Figure 12:
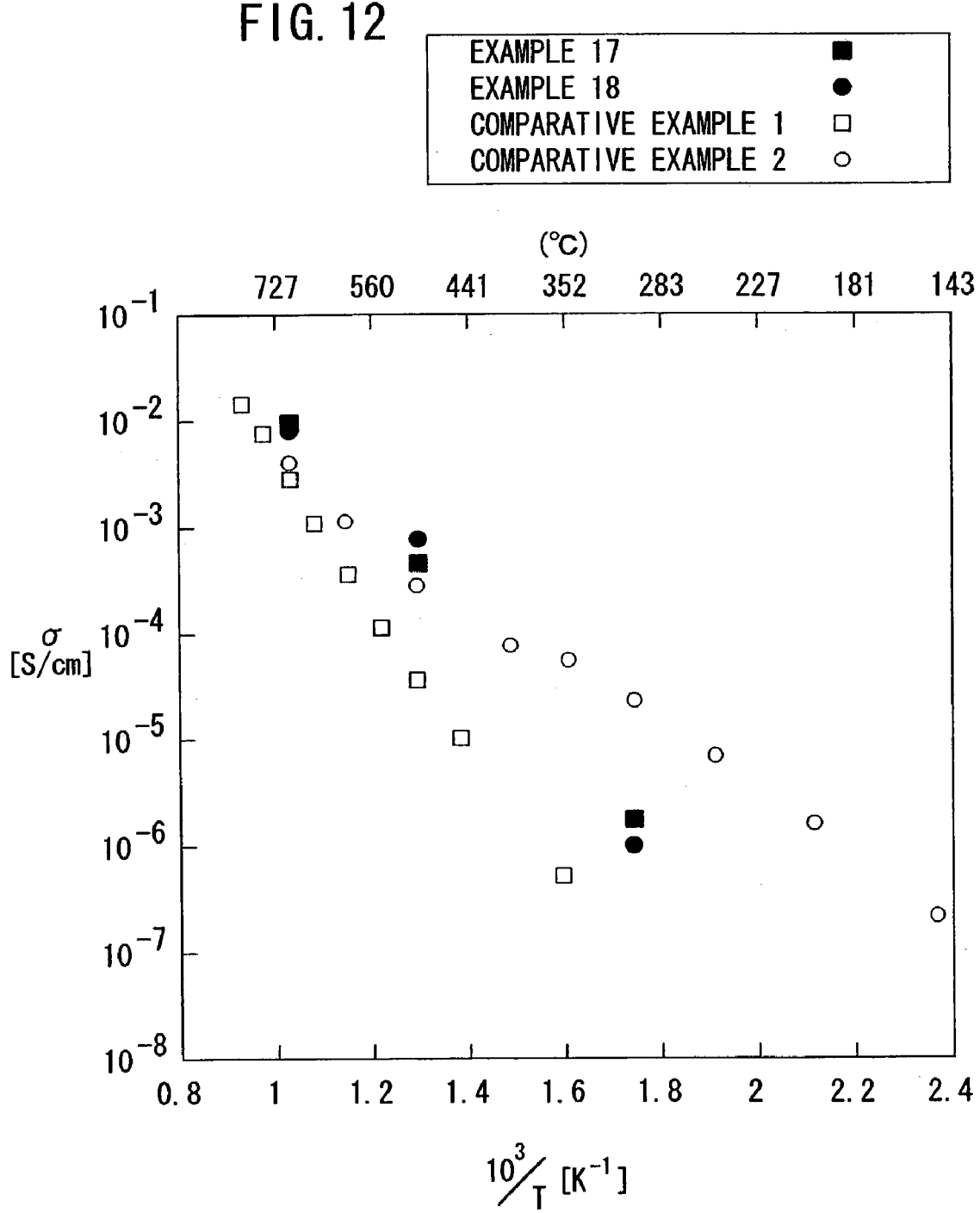
FIG. 12 shows a graph illustrating the relationship between the oxide ion conductivity and the temperature in relation to the oxide ion conductors of Examples 17 and 18 and Comparative Examples 1 and 2.

Thenafter, the oxide ion conductivities of the oxide ion conductors of Examples 15 to 18 were calculated in the same manner as described above. Results are shown as functions of the temperature in FIGS. 11 and 12. FIG. 11 is illustrative of the comparison between Examples 15 and 16 and Comparative Examples 1 and 2. FIG. 12 is illustrative of the comparison between Examples 17 and 18 and Comparative Examples 1 and 2. According to FIGS. 11 and 12, it is clear that the oxide ion conductivities of the oxide ion conductors of Examples 15 to 18 are higher than those of the oxide ion conductors of Comparative Examples 1 and 2, when the temperature is not less than 500° C.

Further, oxide ion conductors having various compositions were obtained in accordance with Example 1 except that the $La_2O_3$ powder, the $GeO_2$ powder, and an $NH_4H_2PO_4$ powder were mixed in weights shown in FIG. 13. These products are designated as Examples 19 to 22. FIG. 13 also shows respective values of s, 6-n, n, p of the oxide ion conductors $La_s(GeO_4)_{6-n}(PO_4)_nO_p$ of Examples 19 to 22.

Figure 14:
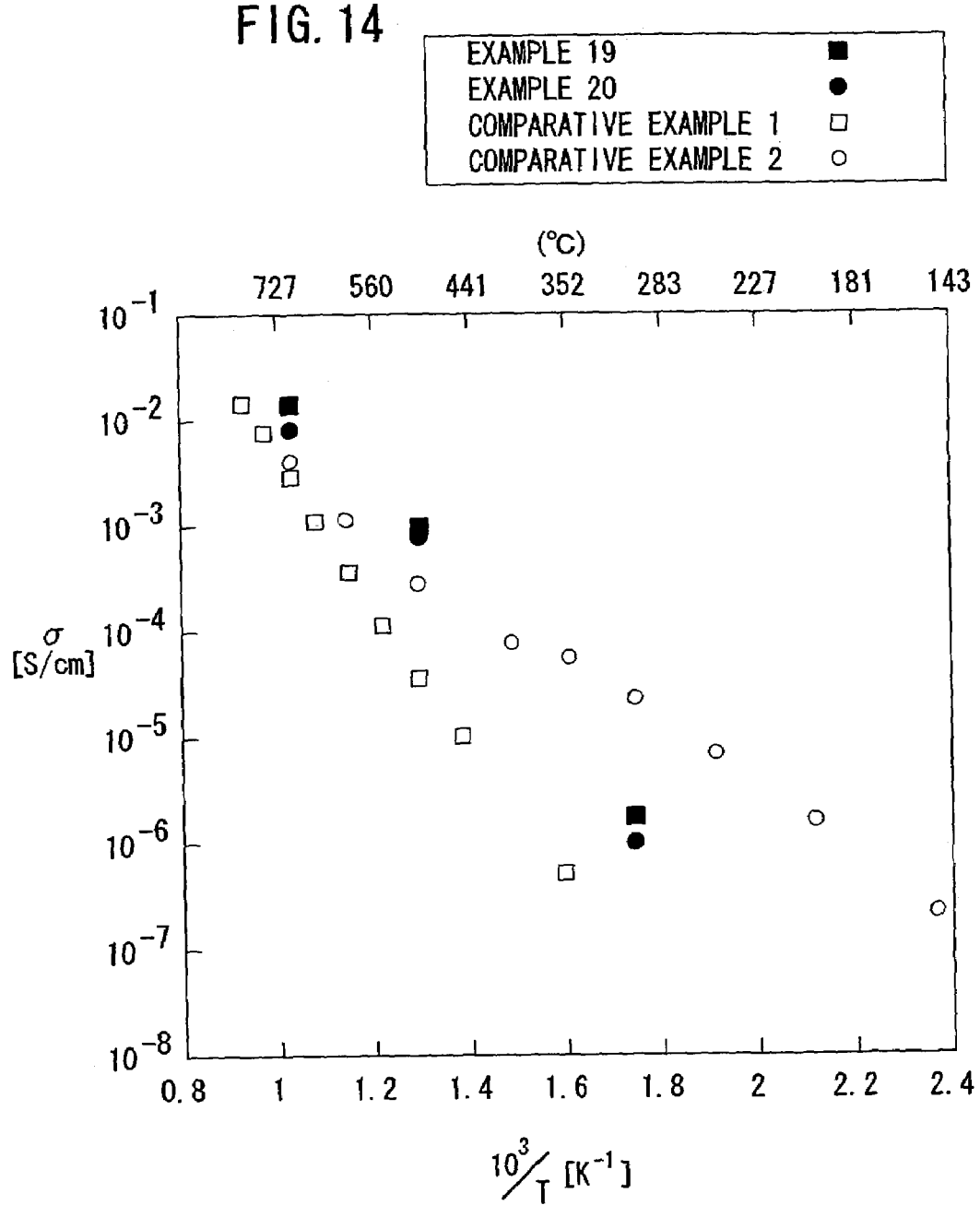
FIG. 14 shows a graph illustrating the relationship between the oxide ion conductivity and the temperature in relation to the oxide ion conductors of Examples 19 and 20 and Comparative Examples 1 and 2.

Thenafter, the oxide ion conductivities of the oxide ion conductors of Examples 19 to 22 were calculated in the same manner as described above. Results are shown as functions of the temperature in FIGS. 14 and 15. FIG. 14 is illustrative of the comparison between Examples 19 and 20 and Comparative Examples 1 and 2. FIG. 15 is illustrative of the comparison between Examples 21 and 22 and Comparative Examples 1 and 2. According to FIGS. 14 and 15, it is clear that the oxide ion conductivities of the oxide ion conductors of Examples 19 to 22 are higher than those of the oxide ion conductors of Comparative Examples 1 and 2, when the temperature is not less than 500° C.

The results from above suggest that a fuel cell, which can be operated at a middle range temperature of 500 to 700° C., can be constructed by adopting an oxide ion conductor composed of $La_lX_m(AO_4)_{6-n}(ZO_4)_nO_p$ ($8 \leq l+m<10$, $0 \leq m \leq 2$, $0 \leq n \leq 2$, $0 \leq p \leq 2$) as a solid electrolyte.

As explained above, the crystals of the composite oxide, in which the value of (l+m) in $La_lX_m(AO_4)_{6-n}(ZO_4)_nO_p$ is controlled to be 8 or more but less than 10, have the strained apatite type structure. Therefore, the composite oxide exhibits excellent oxide ion conductivity even at a middle range temperature of 500 to 700° C. Therefore, the composite oxide (oxide ion conductor) as described above can be adopted, for example, as a preferred solid electrolyte for the fuel cell.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A method of producing an oxide ion conductor, comprising the steps of:

obtaining a mixed powder in which a lanthanum compound, a compound of a tetravalent element A, and at least one of a compound of a divalent or tetravalent element X and a compound of a trivalent or pentavalent element Z are mixed in a ratio to produce $La_lX_m(AO_4)_{6-n}(ZO_4)_nO_p$ provided that $8 \leq l+m \leq 9.33$, $0 \leq m \leq 2$, $0 \leq n \leq 2$, $0 \leq p \leq 2$, $m+n \neq 0$;

forming said mixed powder to obtain a formed product; and sintering said formed product at a temperature of 1450 to 1600° C. to obtain said oxide ion conductor having a crystalline structure which belongs to an apatite type structure and having a composition formula which is represented by $La_lX_m(AO_4)_{6-n}(ZO_4)_nO_p$ provided that $8 \leq l+m \leq 9.33$, $0 \leq m \leq 2$, $0 \leq n \leq 2$, $0 \leq p \leq 2$, $m+n \neq 0$, wherein a Ge compound is selected as said compound of element A, a Sr compound or a Zr compound is selected as said compound of element X, and an Al compound or a P compound is selected as said compound of element Z.

2. The method of producing said oxide ion conductor according to claim 1, wherein said sintering is performed at a temperature of 1500° C.

3. The method of producing said oxide ion conductor according to claim 1, wherein said lanthanum compound, said Ge compound, said Sr compound, said Zr compound, said Al compound, and said P compound are oxides.

4. A method of producing an oxide ion conductor, comprising the steps of:

obtaining a mixed powder in which a lanthanum compound, a compound of a tetravalent element A, and at least one of a compound of a divalent or tetravalent element X and a compound of a trivalent or pentavalent element Z are mixed in a ratio to produce $La_lX_m(AO_4)_{6-n}(ZO_4)_nO_p$ provided that $8 \leq l+m \leq 9.33$, $0 \leq m \leq 2$, $0 \leq n \leq 2$, $0 \leq p \leq 2$, $m+n \neq 0$;

heating said mixed powder at a temperature of 700 to 1200° C. to obtain a granular material of a composite oxide of lanthanum and germanium having a crystalline structure which belongs to an apatite type structure and having a composition formula which is represented by $La_lX_m(AO_4)_{6-n}(ZO_4)_nO_p$ provided that $8 \leq l+m \leq 9.33$, $0 \leq m \leq 2$, $0 \leq n \leq 2$, $0 \leq p \leq 2$, $m+n \neq 0$;

pulverizing said granular material to obtain a composite oxide powder;

forming said composite oxide powder to obtain a formed product; and sintering said formed product at a temperature of 1450 to 1600° C. to obtain said oxide ion conductor composed of said composite oxide, wherein a Ge compound is selected as said compound of clement A, an Sr compound or a Zr compound is selected as said compound of element X, and an Al compound or a P compound is selected as said compound of element Z.

5. The method of producing said oxide ion conductor according to claim 4, wherein said sintering is performed at a temperature of 1500° C.

6. The method of producing said oxide ion conductor according to claim 4, wherein said lanthanum compound, said Ge compound, said Sr compound, said Zr compound, said Al compound, and said P compound are oxides.

* * * * *